United States Patent [19]

Horrocks

[11] 4,418,281
[45] Nov. 29, 1983

[54] QUENCH CORRECTION IN LIQUID SCINTILLATION COUNTING

[75] Inventor: Donald L. Horrocks, Placentia, Calif.

[73] Assignee: Beckman Instruments, Inc., Fullerton, Calif.

[21] Appl. No.: 278,769

[22] Filed: Jun. 29, 1981

[51] Int. Cl.³ .......................... G01T 1/00; G01T 1/20
[52] U.S. Cl. .................................... 250/328; 250/366
[58] Field of Search .................. 250/328, 361 R, 362, 250/366, 369

[56] References Cited

U.S. PATENT DOCUMENTS

| | | | |
|---|---|---|---|
| 3,715,584 | 2/1973 | Rosenstingl | 250/328 |
| 3,717,753 | 2/1973 | Thomas | 250/328 |
| 4,029,401 | 6/1977 | Nather | 250/328 |
| 4,075,480 | 2/1978 | Horrocks | 250/328 |

Primary Examiner—Janice A. Howell
Attorney, Agent, or Firm—R. J. Steinmeyer; R. R. Meads; G. T. Hampson

[57] ABSTRACT

A method of quench correction in liquid scintillation counting which compensates for the effect of sample quench. A quench corrected pulse height window is established for measuring sample scintillations. A pulse height threshold is established distinguishing regions for which a measure of sample quench, derived conventionally, is either proportional to or not proportional to the actual effect of quench on the sample pulse height spectrum. The quench corrected window is compared with the pulse height threshold, and the relative position of the corrected window is adjusted if the comparison step indicates that the window lies in the region of nonproportionality.

8 Claims, 3 Drawing Figures $W_u = 400$  $T = 300$

| $\Delta_{CD}$ | $W_{ADJ} = W_u - \Delta_{CD}$ | $W_{ADJ+COR} = 0.75(W_u - \Delta_{CD}) + 0.25T$ | FINAL ROUNDED TO NEAREST INTEGER |
|---|---|---|---|
| 50 | 350 | — | 350 |
| 100 | 300 | — | 300 |
| 150 | 250 | 262.5 | 263 |
| 200 | 200 | 225 | 225 |
| 250 | 150 | 187.5 | 188 |
| 300 | 100 | 150 | 150 |
| 350 | 50 | 112.5 | 113 |
| 400 | 0 | 75 | 75 |
| 450 | 0 | 62.5 | 63 |
| 500 | 0 | 50 | 50 |
| 550 | 0 | 37.5 | 38 |
| 600 | 0 | 25 | 25 |

| | QUENCH CORRECTION (PRIOR ART) | | QUENCH CORRECTION (PRESENT INVENTION) | |
|---|---|---|---|---|
| $\Delta_{CD}$ | EFF (%) CH 1 | EFF (%) CH 2 | EFF (%) CH 1 | EFF (%) CH 2 |
| 25 | 56.52 | 0.65 | 55.52 | 0.53 |
| 40 | 51.60 | 0.64 | 50.88 | 0.61 |
| 64 | 44.29 | 0.78 | 43.69 | 0.78 |
| 96 | 34.81 | 1.22 | 34.33 | 1.05 |
| 142 | 21.90 | 2.00 | 22.51 | 1.25 |
| 179 | 14.30 | 2.80 | 15.30 | 1.26 |
| 206 | 8.96 | 3.37 | 10.88 | 1.25 |
| 238 | 4.42 | 3.42 | 6.46 | 1.16 |
| 265 | 1.80 | 3.43 | 3.82 | 1.14 |
| 292 | 0.45 | 2.83 | 2.06 | 1.10 |

FIG. 3

QUENCH CORRECTION IN LIQUID SCINTILLATION COUNTING

BACKGROUND OF THE INVENTION

1. Field of the Invention

The present invention relates generally to liquid scintillation counting and, more particularly, to methods of correcting measurements of a liquid scintillation sample for sample quench.

2. Description of the Prior Art

Liquid scintillation counters are widely used to measure the number and energy levels of radioactive emissions from a substance. In liquid scintillation counting a radioactive sample is combined with an organic scintillation solution, and the resulting mixture constitutes the liquid scintillation sample analyzed by the instrument. The scintillation solution emits burst of light called scintillations in response to each radioactive emission from the radioactive sample. The counter measures the intensity or pulse height of each scintillation to determine the corresponding energy of the radioactive emission causing the scintillation, and counts the number of scintillations in selected pulse height channels or windows. The liquid scintillation counter thereby develops a pulse height spectrum for the liquid scintillation sample comprising a profile of numbers or count rate of scintillations vs. intensity or pulse height of the scintillations (energy).

It is well known that the phenomenon of quenching in a liquid scintillation sample operates to reduce the intensity and number of detected scintillations and that such reduction in detected scintillations increases as quench increases. The result of quench, therefore, is to shift the pulse height spectrum of the quenched liquid scintillation sample along the pulse height axis to lower pulse height values, and this is commonly referred to as "pulse height shift".

In order to correct for the effect of sample quench, systems have been developed for determining the degree of quench in a sample and for adjusting the relative position of the pulse height spectrum and the window in which sample scintillations are measured by an amount corresponding to the degree of sample quench. Such automatic quench compensation methods, in effect, operate to re-establish the correct relative position of the pulse height spectrum and the measuring window. See, for example, U.S. Pat. No. 4,029,401 assigned to the assignee of the present invention, wherein the correct relative position of spectrum and measuring window is established by adjusting the gain of the multiplier photodetector which detect the light scintillations or by adjusting the actual window settings in which the sample is measured or counted. With such systems, a sample may be initially counted without quench correction and the developed pulse height spectrum stored in a suitable memory for later retrieval. Then quench correction can be performed by adjusting the window settings within which sample count information is outputted or retrieved from the stored spectrum for analysis.

Measurement of the degree of sample quench for use in the foregoing quench compensation methods can be performed by any of numerous known techniques. See Horrocks, D. L., "Applications of Liquid Scintillation Counting" (1974), Ch. X. Academic Press. A more recent and highly desirable quench determination method, termed the "H-number technique", is disclosed in U.S. Pat. No. 4,075,480, also assigned to the assignee of the present invention. In the H-number technique, a liquid scintillation sample is irradiated by a standard source (e.g. cesium$^{137}$) to produce a Compton scattered pulse height spectrum. The relative shift of a unique point on the leading edge of the Compton spectrum between the irradiated quenched sample and a similarly irradiated standard sample provides a measure of the sample quench.

Implementation of the foregoing quench correction method has assumed that the sample quench produces a shift in the Compton spectrum of the irradiated quenched sample which corresponds to or is proportional to the shift in the spectrum of the same quenched sample when not irradiated. Unfortunately, however, it has been found that such assumed correspondence does not exist across the full range of scintillation intensity or pulse height values.

With respect to the foregoing, two different phenomenon appear to play a part. First, it is known that the energy response of an unquenched liquid scintillation solution is nonlinear at the low energy end of the absolute energy vs. pulse height relationship. See Horrocks, D. L. "Pulse Height-Energy Relationship of a Liquid Scintillation for Electrons of Energy Less Than 100 keV", Nuclear Instruments and Methods, 30 (1964), pp. 157–160. In this regard, at the low energy end of scintillation intensities, the light output per unit energy input increases for reasons not yet fully understood. The effect of this phenomenon is to produce a pulse height response for a given low energy which exceeds the response predicted from an extrapolation of the high energy responses of the energy vs. pulse height relationship to lower energies.

A second and independent phenomenon takes place at lower scintillation intensities as a result of the minimum energy which must be present to produce a measurable response in a multiplier photodetector. At higher quench levels, some radioactive emissions may not produce enough light to be detected. The result is that only the scintillations of the higher energy portion of the spectrum are detected. Consequently, the shape of the pulse height spectrum will remain relatively unchanged with further increases in quench, but the number of events detected will decrease.

The effect of the two foregoing phenomena, therefore, is to reduce the extent or the relative amount of the sample pulse height shift at the lower values of scintillation intensities typically encountered at the high sample quench levels.

The problem in sample measurement posed by the foregoing arises because quench determination of an irradiated sample and actual measurement of the sample when not irradiated are derived at different scintillation intensities or energy levels. For example, in U.S. Pat. No. 4,075,480, quench determination is based on the relative shift of the leading edge of the Compton spectrum of the irradiated sample at relatively high scintillation intensities. However, the unirradiated sample, particularly if highly quenched, produces a spectrum at, and is measured at, considerably lower scintillation intensities. As indicated previously, the spectrum shift produced by quench at low energy levels is less than that produced at the higher levels. Since the quench correction is based on the extent of spectrum shift at the higher energy levels, the correction thus derived will, in effect, "over-correct" for the actual effect of quench on the unirradiated sample at lower energy levels.

SUMMARY OF THE INVENTION

The present invention resides in a method of quench compensation in liquid scintillation counting which accurately compensates for sample quench across the entire pulse height spectrum of the sample. The method is straightforward in implementation and is readily adapted for use in present liquid scintillation counting systems.

To the foregoing ends, the present invention is embodied in a method of quench correction of a liquid scintillation sample of the type in which the relative position of a selected sample measuring window along the pulse height scintillation intensity axis is adjusted or shifted by an amount based on a measure of sample quench to derive a quench corrected window setting. The invention, in its broadest aspects, contemplates establishing a scintillation intensity (pulse height) threshold which distinguishes (1) a first regions for which the relative pulse height spectrum shift due to quench of an irradiated sample is generally proportional to the corresponding spectrum shift of the quenched sample alone and (2) a second region for which the shift is generally nonproportional. The invention further contemplates the steps of (1) comparing the quench corrected pulse height window setting derived for the quenched sample with the scintillation intensity threshold value to determine whether the corrected setting lies in the proportional or nonproportional region along the scintillation intensity axis, and (2) adjusting the setting of the quench corrected window if the comparison step indicates that the corrected window setting lies in the region of nonproportionality. By virtue of the invention, the extent of quench correction indicated by the sample quench measurement is reduced at higher quench levels to more accurately reflect the actual effect of quench on the sample at the low energy end of the pulse height spectrum.

BRIEF DESCRIPTION OF THE DRAWINGS

FIG. 3 tabulates experimental data taken on tritium containing liquid scintillation samples in two windows or channels and at varying levels of quench.

DESCRIPTION OF THE PREFERRED EMBODIMENT

Figures 1, 2:
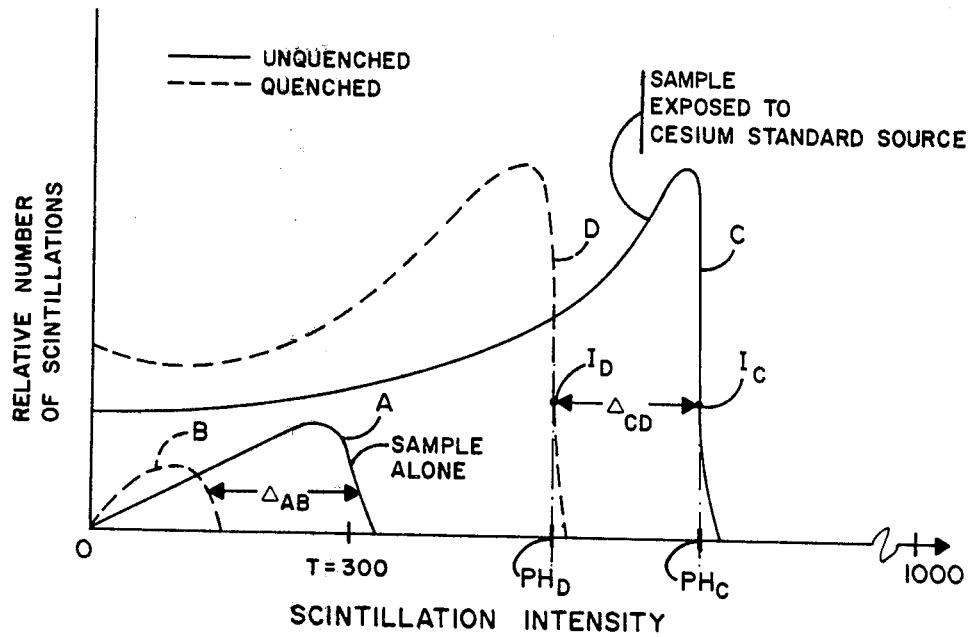
FIG. 1 is a graphical plot of the pulse height spectrum, illustrated as relative number of scintillations vs. scintillation intensity or pulse height (in log energy), of an unquenced sample and of a quenched sample. The figure illustrates the relative shift of the quenched sample pulse height distribution toward lower pulse height values. The figure further illustrates the Compton pulse height spectra generated when the quenched and unquenched samples of FIG. 1 are exposed to radiation from a standard cesium source.
FIG. 2 illustrates in tabular form numerical examples of the adjustment of quench corrected window settings in accordance with the present invention.

Referring now to the drawings, FIG. 1 illustrates pulse height spectra of a quenched and an unquenched liquid scintillation sample. The horizontal axis of the figure represents the scintillation intensity (pulse height) of the detected scintillations of the sample and hence of the energy of the radioactive disintegrations causing the scintillations. The vertrical axis represents the relative number or count rate per unit pulse height of the scintillations. The vertical axis is plotted on a linear scale and the horizontal axis is plotted on a logarithmic scale. The horizontal pulse height axis is labeled in pulse height window setting units arbitrarily from zero to 1,000. The figure thus illustrates the distribution and number or count rate of scintillations across the pulse height spectrum.

In FIG. 1, the spectrum of the unquenched sample alone is depicted as solid curve A and that for the quenched sample as dashed curve B. Note that the spectrum of the quenched sample is shifted to the left in the figure (toward lower pulse height values) with respect to the spectrum of the unquenched sample. The extent of this shift due to quench is shown generally as distance $\Delta_{AB}$.

When a liquid scintillation sample is irradiated by a source of gamma radiation, such as a cesium$^{137}$ source, a relatively high energy Compton pulse height distribution is generated. In FIG. 1 the Compton spectra produced by irradiating the quenched and unquenched samples are illustrated superimposed on the spectra of the same samples when not irradiated. Solid cruve C depicts the Compton pulse height spectrum for the unquenched sample or standard exposed to the cesium source while dashed curve D depicts the Compton spectrum for the quenched sample. Note that the Compton spectrum of the quenched sample is shifted to the left in the figure with respect to that of the standard sample. As taught in previously referenced U.S. Pat. No. 4,075,480, the extent of this Compton spectrum shift is indicative of the degree of quench of the sample and is measured by determining the relative shift of a unique point (e.g. the inflection point (I)) of the leading angle of the Compton distribution. As illustrated, the inflection point $I_C$ of the curve C corresponds to a pulse height value of $PH_C$ while that $I_D$ of curve D corresponds to a pulse height $PH_D$. The shift $\Delta_{CD}$ in the inflection point along the pulse height axis corresponds to $PH_C - PH_D$.

Note that the sample pulse height spectra A and B are situated at a lower energy end of the pulse height axis than are the Compton spectra C and D. The pulse height distribution B of the quenched sample is shifted to the left with respect to distribution A of the unquenched sample by the amount $\Delta_{AB}$. As taught in U.S. Pat. No. 4,075,480, the relative shift $\Delta_{CD}$ measured for the Compton spectra corresponds to and provides a measure of the quench produced shift $\Delta_{AB}$ of the sample spectra. As taught in both above referenced patents, when a range or window of pulse height values is selected within which to measure the sample scintillations, a correction for sample quench is made by shifting the relative position of the sample window along and with respect to the sample pulse height spectrum by an amount corresponding to the measure of quench $\Delta_{CD}$. The effect is to thereby shift the sample window to the left in the figure or to equivalently shift the spectrum to the right by the same amount.

As previously indicated, at lower scintillation intensities (corresponding to high sample quench levels) the relative shift in the sample pulse height spectrum $\Delta_{AB}$ caused by quench is less than the corresponding Compton spectrum shift $\Delta_{CD}$ for the same quenched sample when exposed to the standard source. This is believed to result from the nonlinear response of the liquid scintillation sample to beta energy and of the reduction in the number of photons below the number required to produce a measurable pulse in the photomultiplier detector. The shift $\Delta CD$ of Compton spectra at the high energy end of the pulse height axis, however, is comparatively unaffected by these phenomena. The reslt is that when measuring a sample at the lower energy end of the pulse height scale, the measure of quench $\Delta_{CD}$ as derived at the higher energy end tends to "over-correct" the relative window setting for the sample. That is, it tends to position the quench corrected window too far to the left in FIG. 1 at a lower energy value than necessary.

In accordance with a primary aspect of the present invention, a threshold value of scintillation intensity (pulse height) is established above which the Compton spectrum shift $\Delta_{CD}$ produced by quench of the irradiated sample is generally proportional to the shift $\Delta_{AB}$ of the quenched sample and below which the shift is generally nonproportional. The invention contemplates establishing a quench corrected pulse height window (with upper and lower pulse height limits or settings) for measuring the sample, comparing the pulse height settings of the corrected window to the threshold pulse height value, and adjustng the relative position of the corrected pulse height window setting(s) by a predetermined amount if the window setting(s) lies in the regions of nonproportionality. The method adjusts whichever setting or settings of the window lie in the region of nonproportionality (either one or both window settings). As a result, a sample window which otherwise would have been shifted to an over-corrected position is restored to a position which accurately reflects the effect of quench on the sample pulse height spectrum.

For the liquid scintillation counting system implementing the present invention, a suitable pulse height threshold value T was empirically determined to be at 300 on the pulse height axis. If a quench corrected window setting is derived having either its lower window setting or both its lower and upper window settings less than or equal to T, then such window setting(s) is adjusted to a higher setting in accordance with the present invention. The following parameters and equations set forth a preferred method of practicing the present invention.

Assume that a window is selected for measuring an unquenched sample defined between upper and lower window settings W (i.e. $W_L$=lower setting and $W_U$=- upper setting) on the pulse height axis. Such sample measuring window can be the window within which the sample is to be actually counted in the liquid scintillation counter. Alternatively, such window may be that from which stored sample count information of a previously counted sample (counted without being corrected for quench) is to be outputted or retrieved from a memory or other storage location for analysis. Assume further that a quench determination for the sample is made by measuring the shift $\Delta_{CD}$ in the Compton spectra caused by sample quench. In such case, in accordance with the aforementioned U.S. Pat. No. 4,075,480, the upper and lower sample window settings W (i.e. $W_U$ and $W_L$) are adjusted by the amount $\Delta_{CD}$ to derive a quench corrected window settings $W_{ADJ}$ (both upper and lower) for measuring the quenched sample. The adjusted window settings are derived by shifting the selected window setting W to the left along the pulse height axis by the amount $\Delta_{CD}$.

In accordance with a primary aspect of the present invention the quench corrected window settings $W_{ADJ}$ are compared to threshold pulse height setting T. If either of the adjusted, quench corrected window settings $W_{ADJ}$ is greater than or equal to the threshold setting T, the adjusted window setting $W_{ADJ}$ is acceptable for measuring the sample. However, if either of the settings $W_{ADJ}$ is less than threshold T but greater than zero, than a corrective term $W_{COR}$ is derived for correcting the value of such adjusted window setting(s) $W_{ADJ}$. It has been empirically determined that an acceptable corrective term $W_{COR}$ corresponds to 25% of the different between threshold setting T and adjusted window setting $W_{ADJ}$. This correction factor $W_{COR}$ is then added to $W_{ADJ}$ to readjust the window setting toward a higher pulse height value to the extent of this 25% difference to establish a final corrected window setting $W_{ADJ+COR}$.

The foregoing operation is represented by the following equation (1):

$$W_{ADJ+COR} = 0.75(W - \Delta_{CD}) + [T - (W - \Delta_{CD})] \times 0.25 \quad (1)$$

If $W_{ADJ+COR} \leq 0$, then the equation is taken as $$W_{ADJ+COR} = 0.25(W - \Delta_{CD}) + 0.25\, T \quad (2)$$

An example of the use of the foregoing equation (1) for a lower window setting $W_L$=400 and threshold T=300 is set forth in FIG. 2. The figure presents a comparison between (1) the quench corrected window settings $W_{ADJ}$ derived by the technique of U.S. Pat. No. 4,075,480, and (2) the further correction introduced, if required, by the present invention to set a final quench corrected window setting $W_{ADJ+COR}$ for sample scintillation measurement. Actual experimental data taken in two counting channels for a tritium containing liquid scintillation sample with the old and new corrected window setting methods is set forth in FIG. 3—channel 1 having respective lower and upper pulse height window settings of zero and 397 and channel 2 having corresponding lower and upper window settings of 397 and 655. It is evident that correction of the window settings in accordance with the present invention maintains a relatively constant counting efficiency in channel 2. More importantly, the counting efficiency in channel 1 is higher at higher quench levels, which leads to a more accurate determination of the disintegration rate based upon the data from channel 1 which is particularly important when conventional dual-isotope measurements are being performed on a single sample.

In a further preferred embodiment threshold T was determined to be at 400 on the pulse height axis and a 20% correction factor $W_{COR}$ is then added to $W_{ADJ}$ in accordance with the following equations (3) or (4):

$$W_{ADJ+COR} = 0.80(W - \Delta_{CD}) + [T - (W - \Delta_{CD})] \times 0.20 \quad (3)$$

If $W_{ADJ+COR} \leq 0$, then the equation is taken as $$W_{ADJ+COR} = 0.20(W - \Delta_{CD}) + 0.20\, T \quad (4)$$

While determination above of sample quench has been performed by the H-number technique of U.S. Pat. No. 4,075,480, the present invention is useful for adjusting quench corrected windows derived by any other quench determination method, such as but not limited to, the sample channels ratio (SCR) method, the external standard counts (ESC) method, the external standard channels ratio (ESCR) method, etc.

While a preferred embodiment of the invention has been illustrated and described, modifications may be made therein without departing from the spirit and scope of the invention as defined by the appended claims.

What is claimed is:

1. A method of quench correction in the measurement of a liquid scintillation sample comprising the steps of:
   (1) establishing from a measure of sample quench a quench corrected pulse height window for measuring scintillations of the sample;
   (2) establishing a threshold pulse height which distinguishes a first region for which said measure of sample quench is generally proportional to the effect of quench on the sample pulse height spectrum and a second region for which said measure is generally nonproportional;
   (3) comparing the quench corrected pulse height window to the threshold pulse height; and
   (4) adjusting the relative position of the corrected pulse height window if the step of comparing indicates that the quench corrected pulse height window lies in the region of nonproportionality.

2. The method of claim 1 wherein the measure of sample quench is derived by determining the relative shift in the Compton spectra between the sample and a standard sample each when irradiated with a standard source.

3. The method of claim 1 wherein the step of comparing the quench corrected pulse height window comprises comparing an upper and a lower window setting of the corrected window and the step of adjusting comprises adjusting either one or both of the corrected window settings based on the results of the comparing step.

4. The method of claim 3 wherein the step of adjusting comprises adjusting the relative position of the corrected window setting(s) toward a higher pulse height value.

5. The method of claim 4 wherein the step of adjusting comprises adjusting by an amount between about 20% to about 25% of the difference betweeen said threshold pulse height and said window setting(s).

6. The method of claim 1 wherein the pulse height window is established for counting scintillations of the sample in a liquid scintillation counter.

7. The method of claim 1, wherein the pulse height window is established for retrieving sample count information of a previously counted sample from a storage location.

8. For use with a liquid scintillation counting system a method of quench correction of a liquid scintillation sample comprising the steps of:
   (1) selecting a pulse height window for measuring scintillation of an unquenched sample;
   (2) developing a measure of sample quench;
   (3) adjusting the relative position of the selected sample pulse height window along the sample scintillation pulse height spectrum by an amount based on the measure of sample quench derived in step (2) to establish a quench corrected pulse height window setting for measuring the sample scintillations;
   (4) establishing a threshold pulse height above which the measure of sample quench developed in step (2) is generally proportional to the effect of sample quench on the sample pulse height spectrum and below which the effect is generally nonproportional;
   (5) comparing the quench corrected pulse height window setting established in step (3) to the pulse height threshold value established in step (4); and
   (6) adjusting the relative position of the corrected pulse height window established in step (3) if the comparison in step (5) indicates that the quench corrected pulse height window lies in the region of nonproportionality.

* * * * *